Oct. 3, 1933.  C. A. DAVIDSON  1,929,397
EXCAVATING APPARATUS
Filed Aug. 18, 1931  5 Sheets-Sheet 1
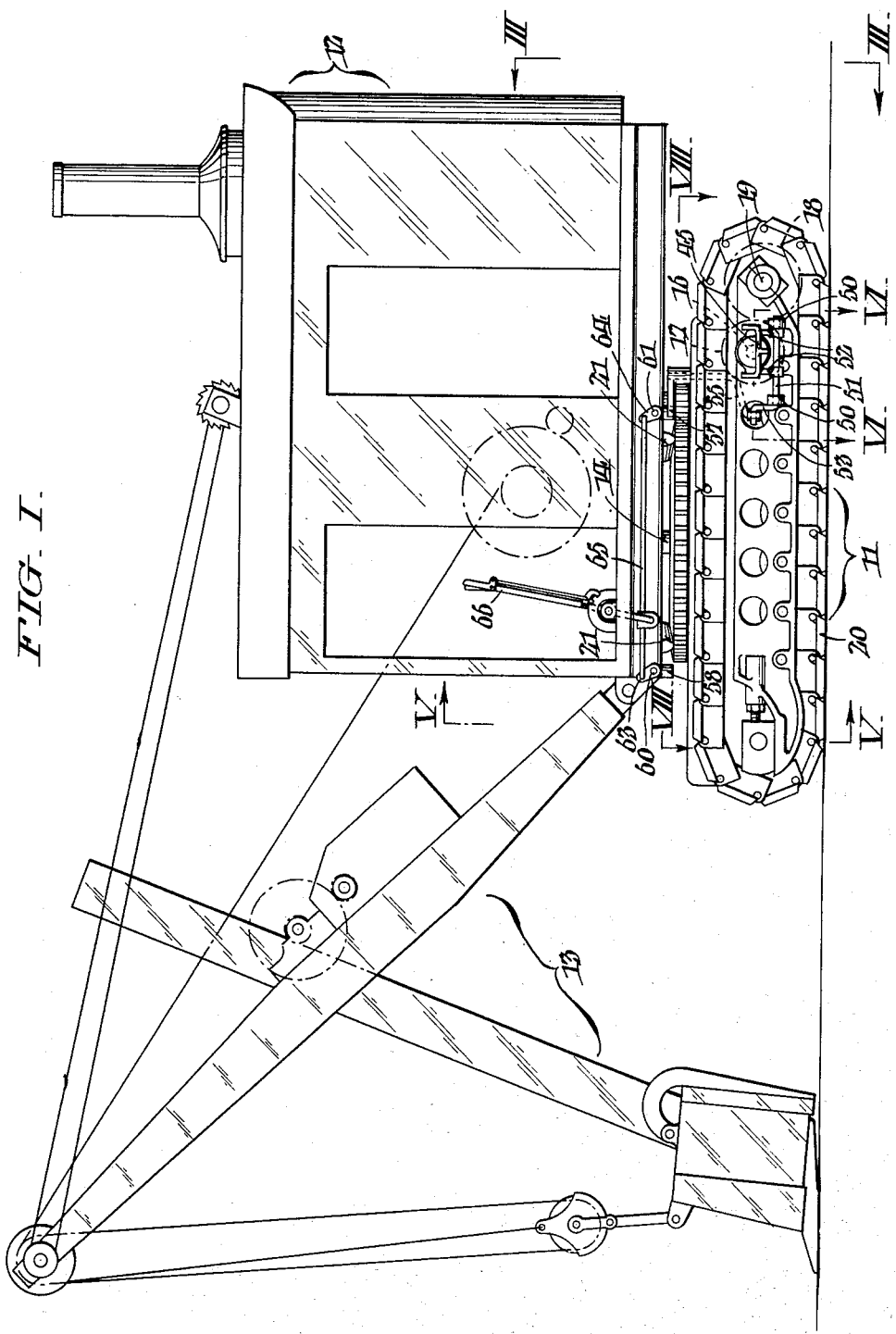

Oct. 3, 1933. C. A. DAVIDSON 1,929,397
EXCAVATING APPARATUS
Filed Aug. 18, 1931 5 Sheets-Sheet 2
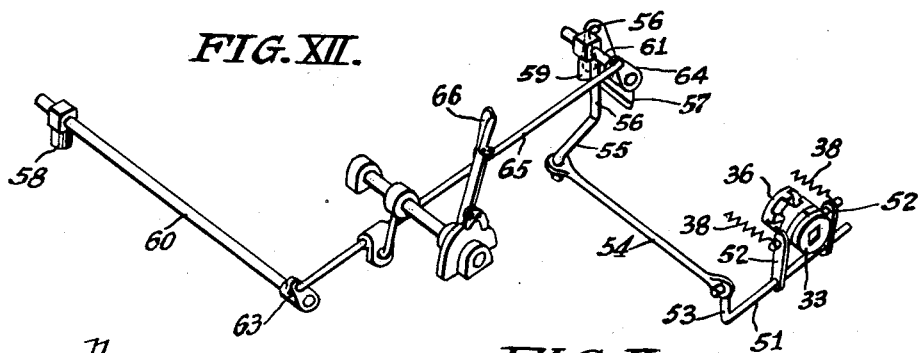
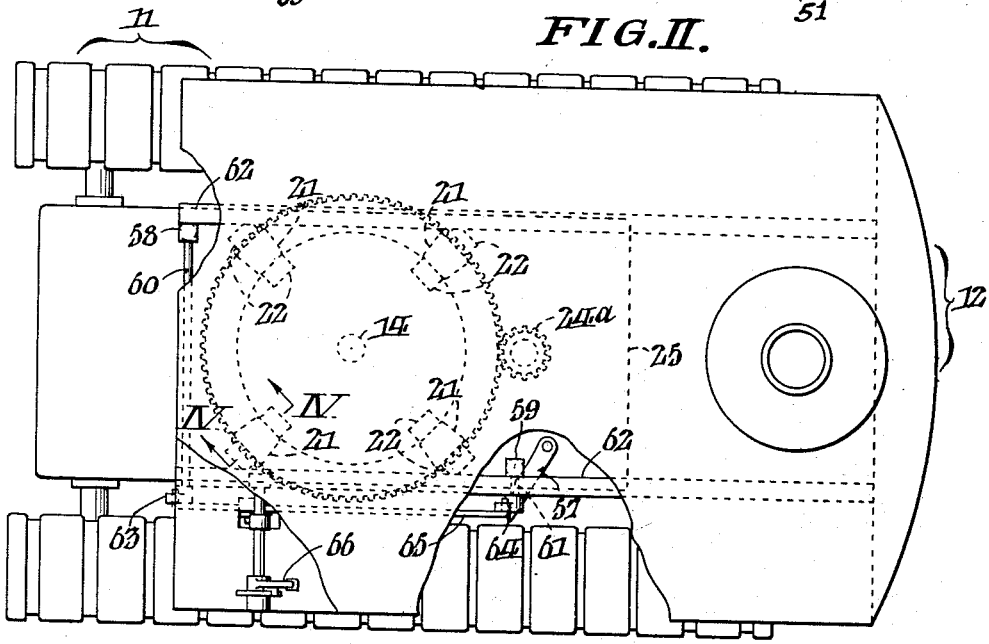
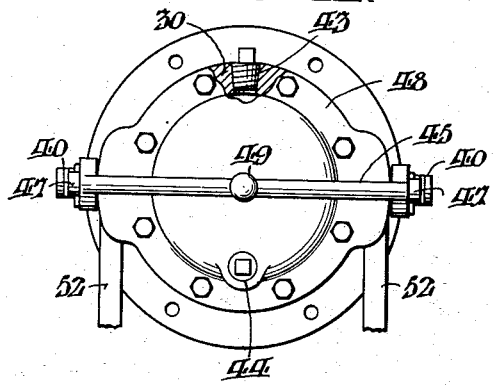
WITNESSES
John A. Weidler
William Bell, Jr.
INVENTOR:
Charles A. Davidson
BY Fraley & Paul
ATTORNEYS.

Oct. 3, 1933.  C. A. DAVIDSON  1,929,397
EXCAVATING APPARATUS
Filed Aug. 18, 1931  5 Sheets-Sheet 3
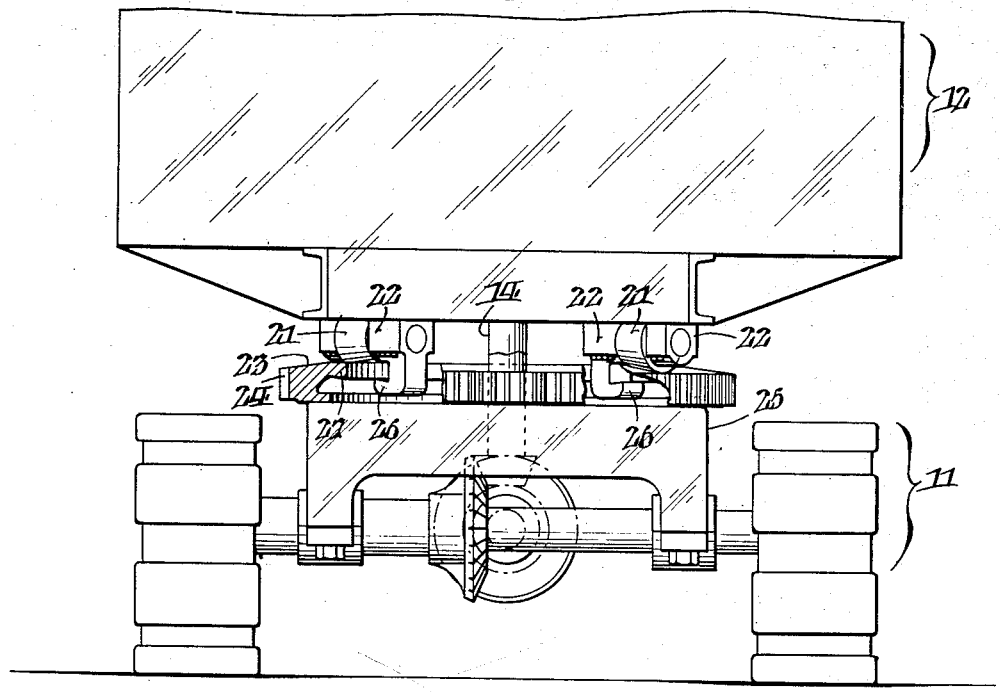
FIG. III
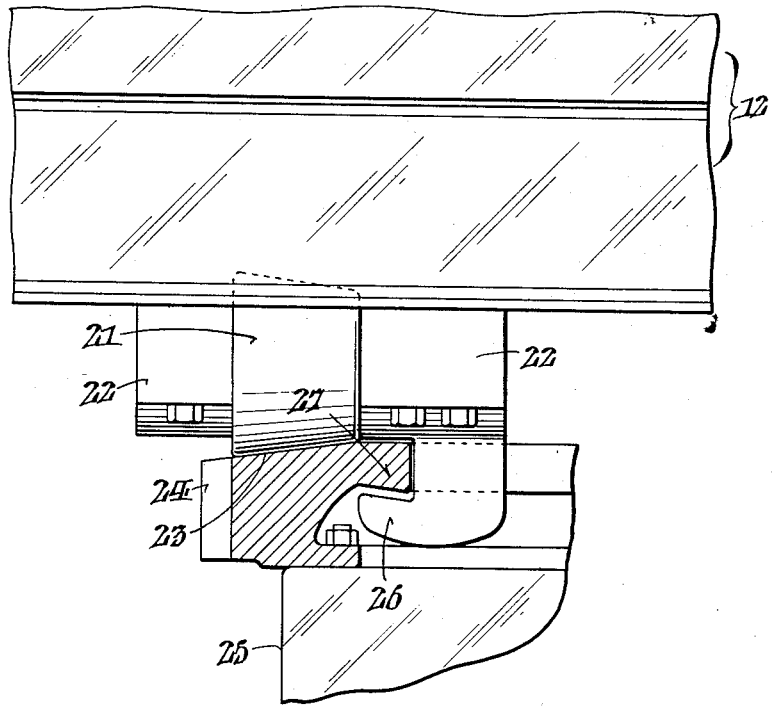
FIG. IV
WITNESSES
John A. Weidler
William Bell, Jr.
INVENTOR:
Charles A Davidson
BY Fraley & Paul
ATTORNEYS.

Oct. 3, 1933.    C. A. DAVIDSON    1,929,397
EXCAVATING APPARATUS
Filed Aug. 18, 1931    5 Sheets-Sheet 4
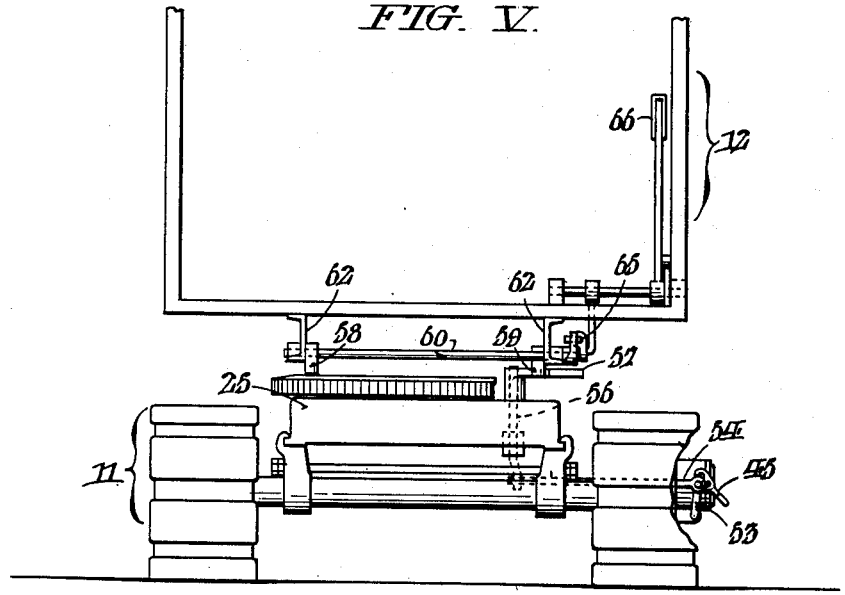
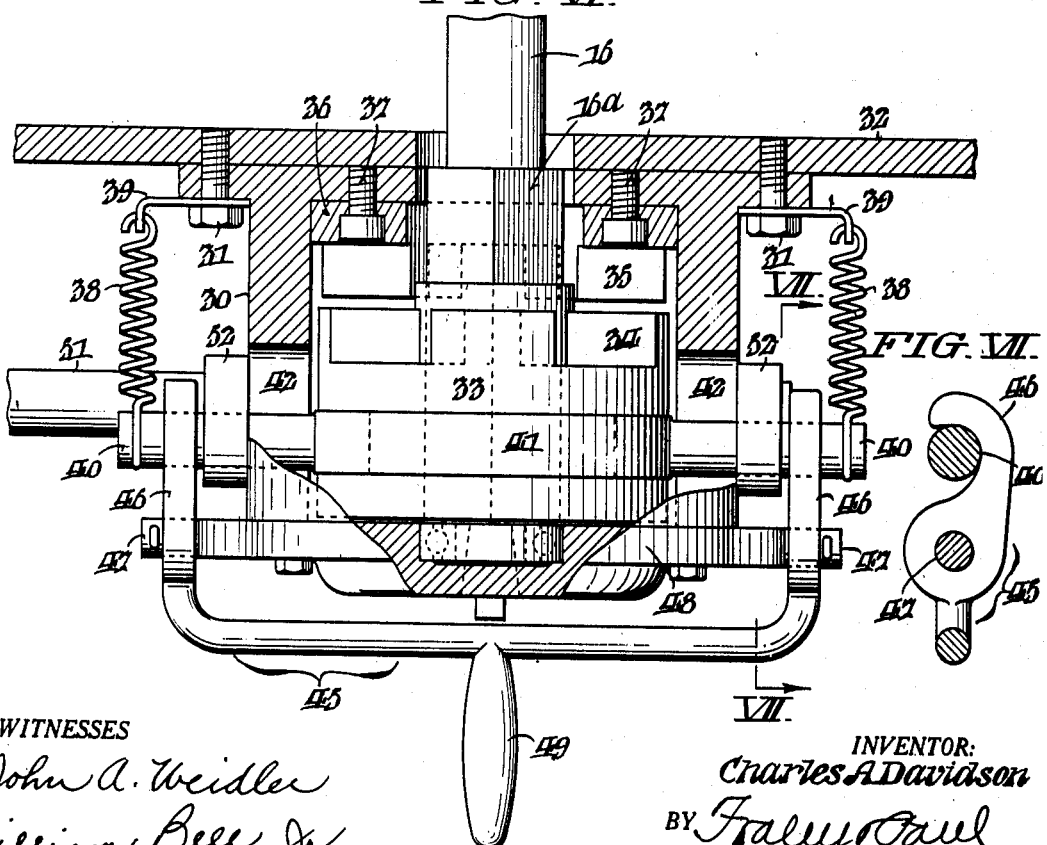

Oct. 3, 1933.  C. A. DAVIDSON  1,929,397
EXCAVATING APPARATUS
Filed Aug. 18, 1931     5 Sheets-Sheet 5
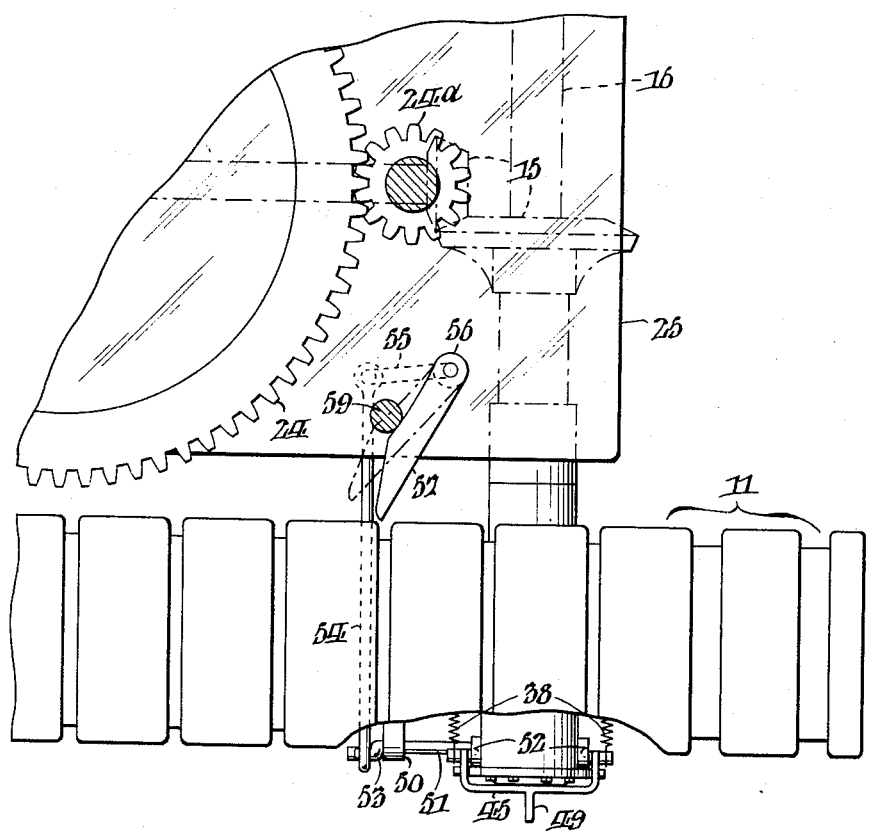
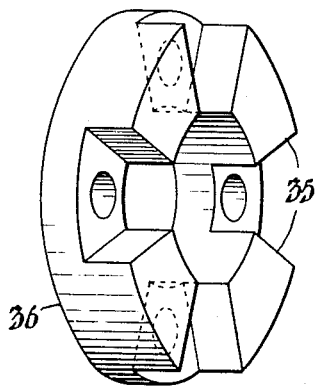
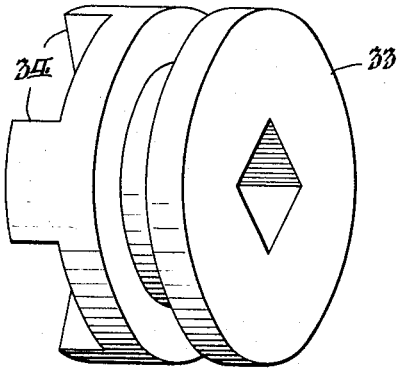
WITNESSES
John A. Weidler
William Bell, Jr.
INVENTOR:
Charles A. Davidson
BY Frailey & Paul
ATTORNEYS.

UNITED STATES PATENT OFFICE 1,929,397

EXCAVATING APPARATUS

Charles A. Davidson, Allentown, Pa., assignor of one-fourth to Charles Kline, one-fourth to Milton Davidson, one-fourth to Ellwood Lawrence, all of Shenandoah, Pa.

Application August 18, 1931. Serial No. 558,850

8 Claims. (Cl. 180—9.1)

This invention relates to excavating apparatus; and it has reference more particularly to excavating apparatus of the kind generally known as "steam shovels" with Caterpillar or crawling tractor belts.

As generally constructed, an excavating apparatus of the type specifically referred to comprises a tractor, and a surmounted operator's cab which contains the machinery for driving the tractor belts to move the apparatus from place to place as well as for actuating the outrigging for the shovel, the said cab being supported with capacity to swing by rollers running on an horizontal annular track at the top of the tractor chassis, about a vertical power shaft whereby motion is communicated from the machinery within the cab to the propeller shaft of the crawling tractor.

My invention has for one of its objects the provision, in connection with excavating apparatus of the type specifically referred to, of safety means for holding the operator's cab to the chassis of the excavator and insuring against displacement of the cab in the event of fracture of the vertical power shaft about which it swings.

Another object is to provide a simple and reliable means whereby the propeller shaft of the tractor may be positively locked against rotation to prevent forward and backward shifting of the apparatus during excavating operations.

A further object is the provision of a manually operable keeper means whereby the locking means aforesaid may be secured in released position while the apparatus is being moved under its own power from one location of operation to another; and, to provide mechanism whereby said locking means can be controlled from the operator's cab so that the tractor may be actuated to positionally shift the apparatus as required during excavating operations.

Still other objects and attendant advantages of this invention will be manifest from the following detailed description of the accompanying drawings, wherein Fig. I is a side elevation of a "steam shovel" excavating apparatus conveniently embodying the present improvements.

Fig. II is a plan view of the apparatus with the shovel outrigging omitted.

Fig. III is a fragmentary end elevation of the apparatus, viewed as indicated by the arrows III—III in Fig. I, with parts broken out to better disclose underlying features.

Fig. IV is a fragmentary illustration partly in elevation and partly in section, taken as indicated by the arrows IV—IV in Fig. II, of the safety means whereby the cab of the excavator is held to the tractor.

Fig. V is a fragmentary end elevation of the apparatus viewed as indicated by the arrows V—V in Fig. I.

Fig. VI is a fragmentary sectional view, taken as indicated by the arrows VI—VI in Fig. I, and showing the locking means whereby the chassis is prevented from shifting incident to excavating operations.

Fig. VII is a detail section taken as indicated by the arrows VII—VII in Fig. VI.

Fig. VIII is a fragmentary plan section of the tractor chassis, taken as indicated by the arrows VIII—VIII in Fig. I, and showing details of the mechanism whereby the locking means can be controlled from the cab of the excavator.

Figs. IX and X are perspective views of cooperative toothed clutch members embodied in the locking mechanism supra.

Fig. XI shows a side elevation of the locking means, and

Fig. XII is a perspective view of the mechanism, controlling the locking means, detached from the vehicle structure.

The excavator chosen for the purposes of illustration herein is, generally speaking, standard in construction, and as shown, comprises a belt tread tractor 11 which is surmounted by an operator's cab 12. As usual, the cab 12 houses a steam engine or other prime mover (not shown) for actuating the outboard excavating shovel mechanism comprehensively designated by the numeral 13. Also, as usual, the cab 12 is rotatable horizontally about a vertical power shaft 14 which, through a suitable clutch mechanism (not illustrated) may be coordinated with the prime mover in the cab 12, and which in turn, through bevels 15, serves to drive the propelling shaft 16 of the tractor 11, see Figs. I, III, VI and VIII. A pair of spur gears 17, 18, Fig. I, communicate motion to one of the shafts 19 carrying the drive sprockets for the tread chains 20 of the tractor 11. The customary supporting rollers 21 at the bottom of the cab 12 are journalled in bearings 22, and run on an annular track 23 afforded by a gear wheel 24 which is concentric with the vertical power shaft 14 and bolted fast to the top frame 25 of the chassis of the tractor 11, see Figs. III and IV. In mesh with the stationary gear 24 is a pinion 24a which, under control of suitable clutch mechanism, is adapted to be driven by the prime mover in the cab 12 to swing said cab about the vertical power shaft 14 in the customary manner.

To hold the cab 12 to the tractor 11, I have formed inner bearings 22 for the rollers 21 with radial lugs 26 adapted to under-reach an internal circumferential projection 27 of the annular track 23. By virtue of this arrangement, the cab 12 is prevented from falling off the tractor chassis 11 in the event of fracture of the vertical power shaft 14 about which the cab 12 swings.

The novel locking means which I have devised to prevent the apparatus from shifting either backwards or forwards incident to excavating operations, has its parts enclosed in a cylindric casing 30. This casing 30 is rigidly secured, by bolts 31, to one of the sprocket journalling frames 32 of the tractor chassis 11 concentrically of one end of the propelling shaft 16, see Figs. I and VI. Slidable on a squared portion 16a of the shaft 16 within the casing 30 is a clutch collar 33 with teeth 34 which project from one of its faces, and which are adapted to intermesh with the teeth 35 of an opposing coaxially-arranged annular clutch member 36 at one end of the casing 30, said collar and annular member being illustrated in perspective in Figs. X and IX, respectively. The annular clutch member 36 is preferably made separate from the casing 30 and secured to the latter by screws 37 so that it may be readily removed and replaced when worn. Referring still to Fig. VI, the clutch collar 33 is subject to a pair of springs 38 which tend to draw it toward the cooperative annular member 36. As shown, the springs 38 are in tension between fixed anchorage clips 39 engaged beneath the heads of two of the bolts 31, and diametral projections 40 of a ring 41 surrounding the collar 33, the said projections extending outward through elongated horizontal slots 42 in the casing 30. In practice, the housing 30 is kept filled with oil or grease so that the enclosed parts are at all times well lubricated and protected against wear. For convenience in replenishing and draining the housing 30 from time to time, it is provided, as shown in Fig. XI, with plug protected filling and draining apertures 43 and 44, respectively at the top and bottom.

To secure the clutch collar 33 of the locking mechanism in retracted position when the apparatus is to be transported over comparatively long distances from one location of operation to another, I have provided a keeper element 45 which has the form of a yoke whereof the extremities 46 are fulcrumed on trunnions 47 projecting laterally from the cover plate 48 of the casing 30. As shown in Fig. VII, the extremities 46 of the keeper element 45 are hook shaped for capacity to engage the protruding ends of the diametral projections 40 of the ring 41. For convenience of manual manipulation, the keeper element 45 is formed with a handle 49, which latter is sufficiently heavy to overbalance the weight of the hook extremities 46. The keeper element 45 will thus automatically swing to inactive upright position, as shown in Fig. V, upon being disengaged from the projections 40 of the ring 41 on the clutch collar 33.

The mechanism provided for controlling the locking means just described from the operator's cab 12 to enable shifting of the apparatus from one position to another incident to excavation, is as follows: Journalled in bearings 50 on the side frame 32 of the crawling tractor chassis 11 is a horizontal shaft 51 with upward arms 52 engaging the projections 40 of the ring 41 on the clutch collar 33 respectively inwards of the plane of the hook extremities 46 of the keeper element 45, see Figs. I, VI and VIII. At one end, the shaft 51 is formed with a crank 53 which is coupled, by means of a link 54, with an arm 55 at the lower end of a vertical shaft 56 with bearing support in the top frame 25 of the tractor 11. At its upper end above the chassis frame 25, the vertical shaft 56 just referred to, has pinned to it a cam arm 57. This cam arm 57 is adapted to be engaged by pendant fingers 58 and 59 respectively secured to transverse rock shafts 60, 61 which are journalled in the spaced channel sills 62 whereon the cab 12 rests, see Fig. V. From Figs. I, II and XII, it will be observed that the rock shafts 60 and 61 are symmetrically arranged with regard to the pivot shaft 14 about which the cab 12 swings; and furthermore that the pendant fingers 58, 59 occupy positions diagonally of the floor of the cab 12. Upward arms 63 and 64 on the shafts 60, 61 are coupled, for actuation in unison, through the medium of a horizontal link 65 (Figs. I, II and XII) which is shiftable by means of a hand lever 66 conveniently accessible to the operative within the cab 12 of the excavator. By virtue of the arrangement just described it will be seen that as the cab 12 is swung into longitudinal alignment in respect to the tractor chassis 25 with the outboard shovel rigging 13 either fore or aft, one or the other of the fingers 58, 59 is brought into position in readiness to actuate the cam arm 57, by manipulation of the hand lever 66 in the cab 12, thereby to release the locking collar 33. With the latter accomplished, the apparatus may obviously be shifted from one position to another as may be required incident to excavation. When the cab 12 is swung to other positions than those mentioned, both the fingers 58, 59 will be remote from the cam arm 57 and therefore incapable of actuating the locking means, so that the tractor will be held immovable.

Having thus described my invention, I claim:

1. In excavating apparatus of the character described including a tractor; means for locking the propelling shaft of the tractor to prevent forward and backward shifting of the apparatus incident to excavating operations, said means comprising a cylindric casing fixed on the tractor frame and enclosing a toothed collar capable of being axially slid on the said propelling shaft toward and away from a coaxial toothed clutch member removably secured within the casing at one end; and overbalanced keeper means adapted for manipulation to secure the toothed collar in retracted position 2. In excavating apparatus of the character described including a tractor; means for locking the tractor propelling shaft against rotation to prevent forward and backward shifting of the apparatus incident to excavating operations, said means comprising a toothed collar slidable on the propelling shaft within a concentric closed-in cylindric-casing fixed to the tractor frame, said collar being spring-urged toward an opposing toothed clutch member removably secured within the casing aforesaid; and means whereby the shiftable collar of the locking means may be secured in retracted position away from the opposing locking member when the apparatus is to be moved from one location to another.

3. In excavating apparatus of the character described, including a tractor; means normally locking the tractor propelling shaft against rotation to prevent forward and backward shifting of the apparatus incident to excavating operations, said means comprising a spring-urged toothed collar slidable on the propelling shaft and adapted to engage with a companion toothed member secured within an enclosing casing fixed on the tractor frame; said casings having a removable cover with diametrical trunnions; and a swingable yoke fulcrumed on said trunnions having hooks for engaging lateral projections of the slidable collar of the locking means to hold it retracted when the apparatus is to be moved from one location to another.

4. In excavating apparatus including a tractor, and a surmounted operator's cab rotatable horizontally about a vertical power shaft with bearing in the tractor and coordinated with the propelling shaft of the latter; means normally locking the propelling shaft against rotation when the cab is out of longitudinal alignment with the tractor, and mechanism whereby the locking means aforesaid may be released from within the operator's cab when the latter is swung into longitudinal alignment with the tractor.

5. In excavating apparatus including a tractor, and a surmounted operator's cab rotatable horizontally about a vertical shaft with bearing in the tractor and coordinated with the propelling shaft of the latter; means normally locking the propelling shaft against rotation to prevent forward and backward shifting of the apparatus incident to excavating operations, said means comprising a toothed collar axially slidable on the propelling shaft and spring-urged into engagement with an opposing toothed member fixed on the tractor frame; and control mechanism whereby the locking means may be released from the operator's cab, comprising a cam arm operatively connected with the sliding collar aforesaid, and a hand lever operated rock shaft on the cab with a pendent finger to coact with the cam arm when said cab is swung into longitudinal alignment with the tractor.

6. In axcavating apparatus including a tractor, and a surmounted operator's cab, rotatable horizontally about a vertical power shaft with bearing in the tractor and coordinated with the propelling shaft of the tractor; means normally locking the propelling shaft against rotation to prevent forward and backward shifting of the apparatus incident to excavating operations, said means comprising a toothed collar axially slidable on the propelling shaft and spring-urged into engagement with an opposing toothed member fixed on the tractor frame; and control mechanism whereby the locking means may be released to permit shifting of the apparatus comprising a horizontal cam arm affixed to an upright shaft on the tractor frame and operatively connected to the sliding collar aforesaid, a pair of transverse rock shafts on the cab symmetrically disposed in respect to the swinging axis of the latter and coupled, for actuation in unison, by a control handle within the operator's cab, and depending fingers on the rock shafts to respectively coact with the cam arm aforesaid when the cab is swung into longitudinal alignment relative to the tractor with the shovel outrigging fore or aft.

7. In excavating apparatus of the character described including a tractor, and an operator's cab supported with capacity for horizontal rotation on the tractor chassis; means for locking the tractor to normally prevent forward and backward shifting of the apparatus incident to excavating operations, and means controlling the locking means comprising shiftable stops adapted to coact with a movable cam arm above the tractor chassis, said arm being so coordinated to the locking means that the latter may be released, to permit shifting of the apparatus from one position to another, only when said cab is longitudinally aligned.

8. In excavating apparatus of the character described including a tractor, and an operator's cab rotatable about a vertical power shaft having bearing in the tractor and coordinated with the propelling shaft of the latter; means normally locking the propelling shaft against rotation to prevent forward and backward shifting of the tractor incident to excavating operations; and control mechanism operatively connected to the locking means including a horizontally swingable arm, diagonally opposed vertically rockable stops adapted to effect swinging of said arm to release the locking means, and means whereby said control mechanism is manipulated from the operator's cab.

CHARLES A. DAVIDSON.